United States Patent [19]

O'Hanlon

[11] Patent Number: 4,660,773

[45] Date of Patent: Apr. 28, 1987

[54] LEAKPROOF HIGH PRESSURE NOZZLE ASSEMBLY

[75] Inventor: Thomas A. O'Hanlon, Tacoma, Wash.

[73] Assignee: Flow Industries, Inc., Kent, Wash.

[21] Appl. No.: 786,155

[22] Filed: Oct. 8, 1985

Related U.S. Application Data

[63] Continuation of Ser. No. 550,232, Nov. 8, 1983, abandoned.

[51] Int. Cl.⁴ .............................................. E21B 7/18
[52] U.S. Cl. .................................... 239/596; 239/600; 175/424
[58] Field of Search .............. 239/600, 596, 591, 589; 175/422; 83/63; 277/1, 3, 27; 285/110

[56] References Cited

U.S. PATENT DOCUMENTS

| | | | |
|---|---|---|---|
| 2,932,531 | 4/1960 | Briechle | 285/110 |
| 3,095,218 | 6/1963 | Eldee et al. | 285/379 X |
| 3,831,753 | 8/1974 | Gaylord et al. | 175/422 X |
| 3,929,341 | 12/1975 | Clark | 277/134 |
| 4,150,794 | 4/1979 | Higgins | 239/596 |
| 4,216,906 | 8/1980 | Olsen et al. | 83/177 X |
| 4,244,521 | 1/1981 | Guse | 175/422 X |
| 4,294,215 | 10/1981 | Hans et al. | 239/600 X |
| 4,473,934 | 10/1984 | Marsac et al. | 83/177 X |

FOREIGN PATENT DOCUMENTS 975029 9/1975 Canada.
2437025 2/1976 Fed. Rep. of Germany.

Primary Examiner—Andres Kashnikow
Assistant Examiner—Kevin Patrick Weldon
Attorney, Agent, or Firm—Flehr, Hohbach, Test, Albritton & Herbert

[57] ABSTRACT

A nozzle assembly comprising a tubular sleeve, a nozzle and a nozzle body. The nozzle and nozzle body are held in an assembled relation with their bores aligned by the tubular sleeve which encircles them. The sleeve provides a seal between the nozzle assembly and the body into which the nozzzle assembly is mounted, and also provides a seal between the nozzle and nozzle body. During use, when under working pressure, the tubular sleeve tends to flow and move both downstream and radially, forming seals between the nozzle assembly and the body into which it is mounted; and between the nozzle and nozzle body, which seals tend to increase in effectiveness as the working pressure increases. In another form, the set screw has a chamfer which engages a corresponding circular corner of said body, preventing downstream flow of the sleeve therebetween.

15 Claims, 4 Drawing Figures

LEAKPROOF HIGH PRESSURE NOZZLE ASSEMBLY

This application is a continuation of application Ser. No. 550,232, filed Nov. 8, 1983, now abandoned.

FIELD OF THE INVENTION

The present invention relates to a nozzle assembly, and more particularly, relates to a high pressure, high velocity fluid jet cutting nozzle assembly operable at pressures of up to at least 60,000 psi with no leakage for extended periods of time.

SUMMARY OF THE INVENTION

Mining tools have been developed which utilize high pressure, high velocity, liquid jets to cut and reduce rock to slurry. Typically such mining tools include at least one cutting head having a plurality of fluid jet forming nozzle assemblies. When operated at pressures of over 20,000 psi, the nozzle in each nozzle assembly is made, typically, from a jewel, such as synthetic sapphire, to reduce erosion of the orifice in the nozzle which forms the fluid jet.

Preventing leakage in such a nozzle assembly when operated at such high pressures is critical since a leak will result in the rapid erosion of the nozzle assembly and the cutting head around the point of leakage. This erosion will reduce the nozzle assembly and cutting head to the point of uselessness in a period of time as short as several minutes, depending on the pressures involved and the materials used in the nozzle assembly and cutting head.

Even in nozzles made from jewels, the orifices eventually erode or clog, thereby necessitating replacement or removal of the nozzle for cleaning. Thus, it is important that the nozzle assemblies be easily removable from the cutting head. However, this needed removability increases the possibility of an undesirable leak each time a nozzle assembly is removed from and replaced in the cutting head. Thus reliable, repeat sealing of the nozzle assembly in the cutting head is essential.

In cutting heads with multiple nozzle assemblies, it is highly desireable that the nozzle assemblies be removable from the exterior of the cutting head, rather than from its interior. This is because such a configuration would likely reduce the cost of the cutting head, and/or the nozzle assemblies, due to increased ease of machining the parts involved; and would likely simplify and reduce the cost of removing and replacing the nozzle assemblies for repair or replacement of the nozzles. In addition, with certain geometries of cutting heads, it might well be physically difficult or impossible to make the nozzle assemblies replaceable from the interior of the cutting head. This will be readily appreciated from a consideration of FIG. 1a.

However, if the cutting head is made so the nozzle assemblies are removable and replaceable from the exterior of the cutting head, then the very high pressure working fluid within the cutting head tends to force such a nozzle assembly outward, thereby tending to unseat the nozzle assembly seals, and causing catastrophic leaks.

In addition, it is highly desirable that the nozzle assembly, including the nozzle itself, be easily replaceable in the field as a unit, in order to reduce expensive down time of the mining equipment, because the nozzle is, by way of non-limiting example, only 0.078 inches in diameter, is hard to handle, and typically has an assymetric geometry which mandates that it must be placed right side up in the nozzle assembly. Field repair would be simplified if the nozzle assembly could be removed and replaced in the field without needing any special tools or equipment other than a common screw driver or allen wrench.

Accordingly, objects of the present invention are to provide a nozzle assembly which has all of these desirable features and which solves all of these problems; which is relatively low in cost, both to manufacture and replace; which effectively seals against pressures of up to at least 60,000 psi; which utilizes hydrostatic pressure to form seals which are stronger as the pressure increases; and which will also provide an accurate, high quality cutting jet.

In basic form, the invention comprises a nozzle and a set screw having complementary flat surfaces which mate very accurately. The nozzle and set screw are about the same diameter at their mating surfaces and have axially aligned bores through which the fluid jet passes. Holding the nozzle and set screw together in an assembled relationship to form the nozzle assembly, is a tight fitting tubular plastic sleeve which encircles and extends between them. The sleeve also acts as a seal between the nozzle assembly and the cutting head.

In one form of the invention, creep of the plastic sleeve under hydrostatic pressure is eliminated by forming a corner in the cutting head, against which the set screw, which has a corresponding chamfer, makes contact downstream from the plastic sleeve.

In both forms, the sealing effectuated by the plastic sleeve tends to increase as the hydrostatic pressure applied to it increases.

The foregoing is not intended to be a detailed catalog of the various objects, features, advantages and characteristics of the present invention, since these and others of the same will be expressly or inherently disclosed to those skilled in the art in view of the disclosures herein.

DESCRIPTION OF THE PREFERRED EMBODIMENTS

Figure 1:
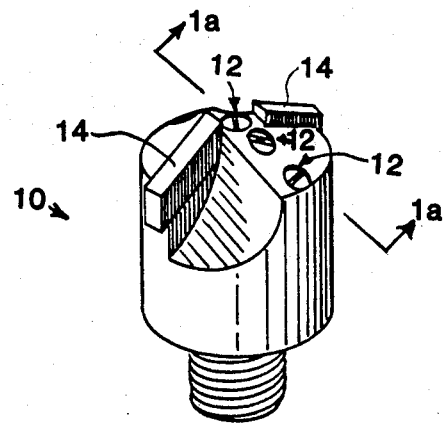
FIG. 1 is a perspective view of a cutting head having a plurality of nozzle assemblies.
Figure 1A:
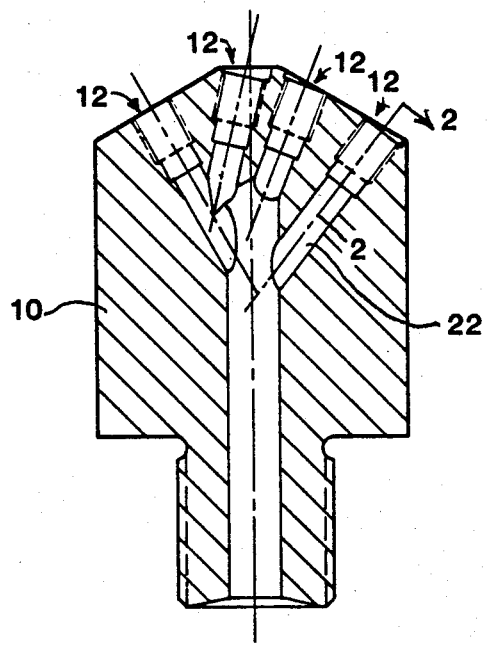
FIG. 1a is a schematic cross-sectional view taken along line 1a—1a of FIG. 1.

FIG. 1 schematically illustrates a cutting head 10 having a plurality of nozzle assemblies 12 of the present invention, and a plurality of cutter tips 14. Cutting head 10, in operation, is connected to a suitable source of high pressure liquid.

Cutting head 10 and cutter tips 14 are shown by way of non-limiting example and form no part, per se, of the present invention. One or more nozzle assemblies 12 can be used with any particular cutting head 10, the number shown in FIG. 1 being by way of non-limiting example.

Figure 2:
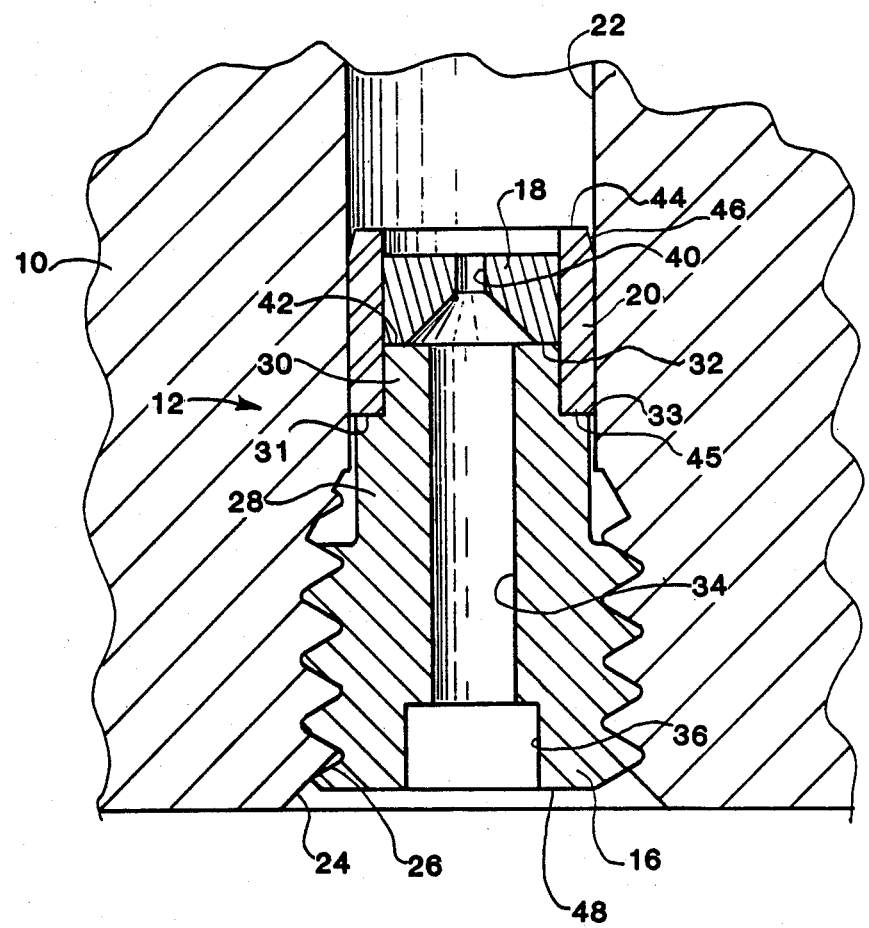
FIG. 2 is a cross-sectional view, taken along line 2—2 of FIG. 1a, of a first form of the nozzle assembly shown installed in a cutting head.

Turning now to FIG. 2, a nozzle assembly 12 of the present invention is shown installed in housing means, namely cutting head 10. Nozzle assembly 12 comprises three parts: nozzle body means, namely set screw 16; jet forming means for forming a liquid cutting jet, namely nozzle 18; and sealing means, namely sleeve 20.

Cutting head 10 defines a nozzle supply passage 22 and a threaded bore 24.

Set screw 16 has a threaded shank 26 sized to threadedly engage bore 24; a first snout 28 of a diameter smaller than the diameter of the nozzle supply passage 22 to permit its entry therein; a second snout 30, smaller in diameter than first snout 28 and terminating in a flat upstream surface 32; a longitudinal bore 34 passing therethrough; a drive recess 36 for being engaged by a drive means, a shoulder 31 formed by the upstream face of first snout 28, and a peripheral corner 33 of shoulder 31.

Nozzle 18 defines a longitudinal bore 40 and a flat surface 42. Sleeve 20 is tubular, and has a peripheral chamfer 46 on its upstream end 44.

Nozzle assembly 12 is assembled by first placing sleeve 20 over the end of second snout 30, so its downstream end 47 is seated on shoulder 31. Then the nozzle 18 is inserted into sleeve 20 until its flat surface 42 is firmly against flat surface 32 of set screw 16. Flat surfaces 42,32 form a seal therebetween, while the sleeve 20 seals the peripheries of nozzle 18 and second snout 30. To better effectuate these seals, it is preferred that the diameters and peripheral configurations of snout 30 and nozzle 18 be the same, although they could be different.

Since the internal diameter of sleeve 20 is about the same as, or slightly smaller than the diameter of snout 30 and nozzle 18, it will be appreciated that the sleeve 20 grips both snout 30 and nozzle 18 in a relatively firm friction and/or elastic grip, thereby holding the nozzle assembly 12 together in an assembled relation so it can be handled conveniently as a unit.

Although in FIG. 2 sleeve 20 is shown extending upstream from shoulder 31 past the upstream face of nozzle 18, it need not necessarily do so. For example, nozzle 18 could be held in place on set screw 16 by other means such as, by way of non-limiting example, with an adhesive and/or by providing a recess in the upstream face 32 of second snout 30 sized to receive nozzle 18. In such event sleeve 20 could have a much shorter longitudinal length and extend upstream from shoulder 31 only a short distance, such as, by way of non-limiting example, below or up to the level of the upstream face 32 of second snout 30.

Returning now to the invention shown in FIG. 2, the outer diameter of sleeve 20, when assembled as part of nozzle assembly 12, and prior to insertion into nozzle supply passage 22 in cutting head 20, is preferably slightly larger than the diameter of passage 22; and the upstream end 44 of sleeve 20 preferably extends a short distance past nozzle 18, but it need not do so. The reasons for these features are discussed below.

Nozzle supply passage 22, sleeve 20, nozzle 18, and set screw 16 are preferably symmetrical about their longitudinal axes and are of circular cross-sectional configurations, but they need not be. Bore 40 in nozzle 18, bore 34 in set screw 16, and drive recess 36 are preferably axially aligned, though they need not be as long as the fluid jet passing, during operation, through bore 34 is not interfered with as it travels through and exits nozzle assembly 12.

Drive recess 36 preferably is sized to be driveable by any conventional drive means such as an allen wrench or screwdriver, by way of non-limiting example, but it could assume other configurations so as to be driven by some other tool. Drive recess 36 need not be located on the longitudinal axis of set screw 16, in which case bore 34 of set screw 16 would extend to the downstream surface 48 of set screw 16.

Strictly by way of non-limiting example, the following specifications of a working embodiment are given. The embodiment was tested at up to 60,000 psi and did not leak. The working fluid was water. There is no reason to believe it would leak at pressures above 60,000 psi.

As to materials, the cutting head 10 and set screw 16 are formed from materials, such as stainless steel, which are strong enough to withstand design operating pressures plus normal safety margins, and which are resistant to corrosion from the working fluid and operating environment. Nozzle 18 is formed from synthetic sapphire, but other materials could be used depending on the particular operating pressures and working fluids used. Sleeve 20 is formed from UHMW-PE (ultra-high molecular weight polyethylene). At working pressures higher than 60,000 psi, soft metals could be used, such as bronze or brass.

As far as sizing of components, nozzle supply passage 22 and first snout 28 have respective diameters of 0.125 and 0.124 inches, leaving a radial clearance of 0.0005 inches therebetween. A smaller clearance would be of advantage. First snout 28 extends into passage 22 0.020 inches past the upstream end of threaded bore 24. Threaded bore 24 and the threaded shank 26 were about 0.160 inches in length and had at least three full threads, and preferably more, to prevent blowout of set screw 16 at operating pressures.

Second snout 30 and nozzle 18 have a diameter of 0.078 inches, but this is not critical. Bore 40 in nozzle 18 has a diameter which is dictated by the particular job at hand, and typically runs from 0.005 to 0.025 inches. The diameter of bore 34 in set screw 16 is, as a rule of thumb, at least twice the diameter of bore 40. Second snout 30 extends 0.030 inches past shoulder 31 of first snout 28, but this dimension is not critical.

Sleeve 20's external diameter, prior to assembly, is 0.125 inches—the same as the diameter of supply passage 22. Sleeve 20's internal diameter, prior to assemby, is 0.076 inches—0.002 inches smaller in diameter than snout 30 and nozzle 18, which it is designed to receive.

Thus, when, sleeve 20, nozzle 18 and snout 30 are assembled, as has been described, sleeve 20 snugly holds nozzle assembly 12 firmly assembled. When assembled, the external diameter of the sleeve 20 increases by about 0.002 inches, as the snout 30 and nozzle 18 are inserted into sleeve 20 which has an undersized internal diameter—making the external diameter of the sleeve 20, when assembled, about 0.002 inches greater in diameter than supply passage 22. When assembled, the upstream end of sleeve 20 extends 0.010 to 0.015 inches past the upstream end of nozzle 18.

Thus this sizing of sleeve 20 serves triple purposes and solves three problems at the same time. That is, it holds sleeve 20, nozzle 18 and a second snout 30 in an assembled relation, it forms a good seal therebetween, and it provides for the necessary oversizing of sleeve 20 as compared to passage 30 to effectuate a good seal therebetween also.

Of course, other ways of solving these problems are possible such as making the internal diameter of sleeve 20 about the same as or slightly greater than the external diameters of nozzle 18 and second snout 30, and using a friction fit and/or adhesive to hold them together and form a seal therebetween. Then sleeve 20 could be made with the necessary oversize external diameter for a good seal with passage 22.

The internal diameter of the threaded bore 24 in cutting head 10 is chosen to be larger than the assembled external diameter of the sleeve 20 to prevent interference therewith when nozzle assembly 12 is being assembled with cutting head 10.

Note, as seen in FIG. 2, that set screw 16, supply passage 22 and threaded bore 24 are physically uncomplicated, thereby making them very easy and low cost to machine, resulting in a simple, low cost nozzle assembly 12.

To assemble the nozzle assembly 12 to cutting head 10, nozzle assembly 12 is screwed into head 10 from the exterior of head 10 by applying a drive tool to drive recess 36 of set screw 16; the chamfer 46 on sleeve 20 aiding in insertion of the oversize sleeve 20 into supply passage 22. Thus, assembly, even in the field is fast, easy, fool proof and requires only a common tool such as an allen wrench or screwdriver. Removal is just as easy and only requires the set screw 16 to be backed out. Then the sleeve 20 and nozzle 18, which are inexpensive enough to be considered throw-away items, are blown out of supply passage 22 by pressurizing the fluid therein, although they could be caught and saved for examination, repair, or possible re-use, if desired.

In operation, supply passage 22 is connected to any suitable source of working fluid at the desired operating pressure. The working fluid forces the flat surfaces 42, 32 of nozzle 18 and second snout 30 tightly together, forming a seal therebetween. The working fluid also bears against the upstream end 44 of sleeve 20, thereby tending to force sleeve 20 downstream until sleeve 20 seats and seals against shoulder 31. Once stopped by shoulder 31, the sleeve 20 then ends to swell radially, both inwardly and outwardly, thereby firmly sealing against nozzle supply passage 22, second snout 30, and nozzle 18. It is important to note that the seals between sleeve 20 and shoulder 31, nozzle 18, second snout 30, and passage 22 grow tighter and more effective as the working fluid pressure increases.

Since the sleeve 20 tends to flow plasticly under the working pressure, it will seal effectively even if the surfaces it contacts are scratched or irregular. Over time, sleeve 20 will tend to very gradually flow through the very small clearance between first snout 28 and supply passage 22, but since such flow would be very slow, and since the upstream end 44 of sleeve 20 was chosen to extend past nozzle 18, sleeve 20 has a longitudinal length sufficient to compensate for any such downstream flow during the design life of nozzle assembly 12. Increased design life is easily achieved by either making sleeve 20 thicker, longer, or from a material which flows less under pressure than UHMW-PE, or by reducing the clearance between first snout 28 and passage 22.

Figure 3:
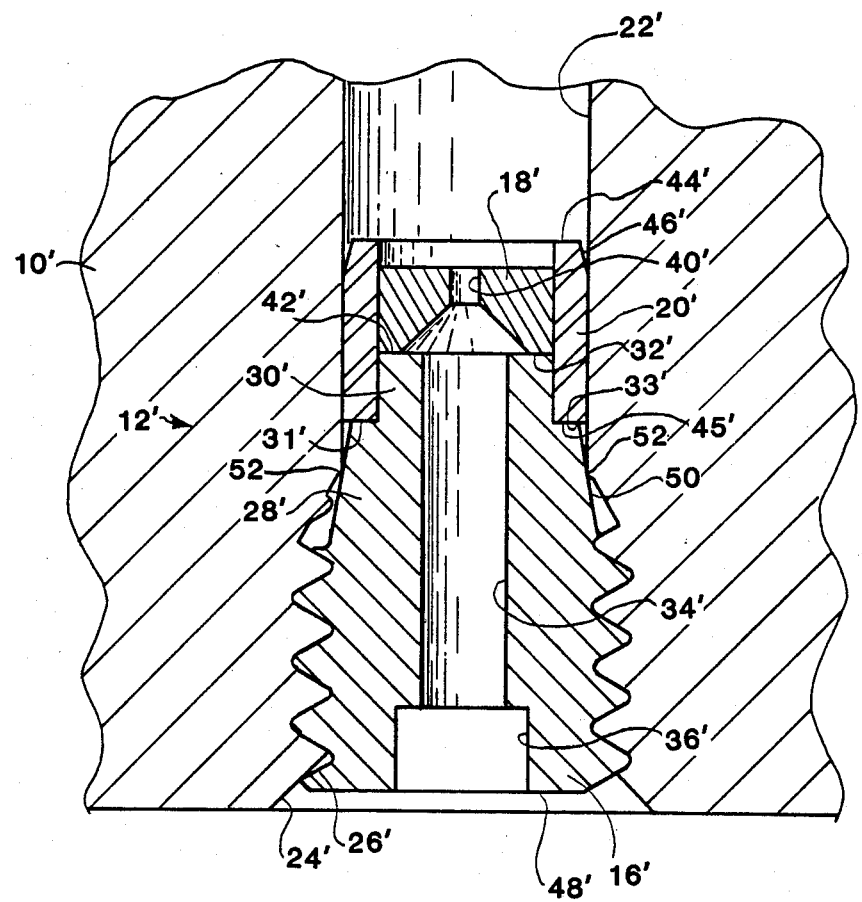
FIG. 3 is a cross-sectional view of a second form of the nozzle assembly shown installed in a cutting head.

Turning now to FIG. 3 which illustrates the second form of the invention, it is identical to the first form of FIG. 2 except as described below, and so the same parts have been given the same reference numerals as in FIG. 2, except with a prime appended thereto.

The only difference in the FIG. 3 form is that a chamfer 50 has been provided on an enlarged first snout 28'. Thus as the set screw 16' is screwed into cutting head 10', the chamfer 50 of first snout 28' engages corner 52 on passageway 22'. This would prevent any tendency of sleeve 20' to flow downstream under working pressure past corner 52 of passage 22'.

Alternatively, a chamber could be provided at the upstream end of threaded bore 24, and first snout 28 could be enlarged and have a square corner 33 adapted to engage such a chamfer when set screw 16 is tightened down, to achieve the same end.

As far as terminology is concerned, since in FIGS. 2 and 3 fluid flow is from the top to the bottom of these figures, upstream is towards the top and downstream is towards the bottom of these figures.

Naturally, the structures described above and illustrated in the Figures could be easily modified to make a leak-proof plug for passageway 22. This is done by simply eliminating bore 34, 34' in set screw 16, 16' and by eliminating nozzle 18, 18'.

In view of the foregoing, various further applications, modifications, adaptations and arrangements of the present invention will readily occur to those skilled in the art to which it is addressed within the scope of the claims which are appended hereafter.

What is claimed is:

1. A fluid cutting jet nozzle assembly for a housing means defining a nozzle supply passageway, wherein said fuid cutting jet nozzle assembly comprises:
    (a) a jet forming means for forming a fluid cutting jet;
    (b) nozzle body means, defining: a bore through which said cutting jet is adapted to pass; a first snout means adapted to be snugly received in and extend upstream in said fluid supply passageway; a second snout means extending upstream from said first snout means and at least partly of smaller diameter than said first snout means; said second snout means having a surface adapted to seat said jet forming means; and a shoulder means defined by the upstream end of said first snout means;
    (c) sealing means at least substantially encircling said second snout means upstream from said shoulder means;
    (d) mounting means for mounting said nozzle body means in said nozzle supply passageway;
    wherein said sealing means are sized to make a snug seal between said passageway and said nozzle body means when said nozzle body means are mounted in said passageway means, and wherein said sealing means tends to flow downstream towards said shoulder means under working pressure and expand radially inwardly and outwardy under working pressure to increase the firmness of said seal as said working pressure increases,
    wherein said assembly is mounted to said housing means from the exterior of said housing means, and
    wherein said passageway defines a corner and said first snout defines a chamfer which is sized to firmly contact said corner when said nozzle assembly and housing means are assembled, to prevent downstream flow of said sealing means between said corner and said chamfer under pressure.

2. The assembly according to claim 1, wherein said sealing means snugly grips said jet forming means and second snout means to hold said jet forming means and second snout means in an assembled relation even when said assembly is not mounted in said housing means.

3. The assembly according to claim 2, wherein said assembly is mounted to said housing means from the exterior of said housing means.

4. A fluid cutting jet nozzle assembly for a housing means defining a nozzle supply passageway, wherein said fluid cutting jet nozzle assembly comprises:

(a) a jet forming means for forming a fluid cutting jet;

(b) nozzle means, defining: a bore through which said cutting jet is adapted to pass; a first snout means adapted to be snugly received in and extend upstream in said fluid supply passageway; a second snout means extending upstream from said first snout means and at least partly of smaller diameter than said first snout means; said second snout means having a surface adapted to seat said jet forming means; and a shoulder means defined by the upstream end of said first snout means;

(c) sealing means at least substantially encircling said second snout means upstream from said shoulder means;

(d) mounting means for mounting said nozzle body means in said nozzle supply passageway;

wherein said sealing means are sized to make a snug seal between said passageway and said nozzle body means when said nozzle body means are mounted in said passageway means, and wherein said sealing means tends to flow downstream towards said shoulder means under working pressure and expand radially inwardly and outwardly under working pressure to increase the firmness of said seal as said working pressure increases, wherein said passageway defines a corner; and wherein said first snout defines a chamfer which is sized to firmly contact said corner when said nozzle assembly and housing means are assembled, to prevent downstream flow of said sealing means between said corner and said chamfer under pressure.

5. The assembly according to claim 4, wherein said assembly is mounted to said housing means from the exterior of said housing means.

6. The assembly according to claim 4, wherein said sealing means snugly grips said jet forming means and second snout means to hold said jet forming means and second snout means in an assembled relation even when said assembly is not mounted in said housing means.

7. The assembly according to claim 6, wherein said assembly is mounted to said housing means from the exterior of said housing means.

8. A fluid cutting jet nozzle assembly for a hosing means defining a nozzle supply passageway, wherein said fluid cutting jet nozzle assembly comprises:

(a) a jet forming means for forming a fluid cutting jet;

(b) nozzle body means, defining: a bore through which said cutting jet is adapted to pass; a first snout means adapted to be snugly received in and extend upstream in said fluid supply passageway; a second snout means extending upstream from said first snout means and at least partly of smaller diameter than said first snout means; said second snout means having a surface adapted to seat said jet forming means; and a shoulder means defined by the upstream end of said first snout means;

(c) flowable sealing means at least substantially encircling said second snout means upstream from said shoulder means for undergoing plastic deformation under operating pressures;

(d) mounting means for mounting said nozzle body means in said nozzle supply passageway, wherein said sealing means are sized to make a snug seal between said passageway and said nozzle body means when said nozzle body means are mounted in said passageway means, and wherein said sealing means tends to flow downstream towards said shoulder means under working pressure and expand radially inwardly and outwardly under working pressure to increase the firmness of said seal as said working pressure increases; and (e) a cavity defined by said passageway and said nozzle body means for accommodating flow of said flowable sealing means.

9. The assembly according to claim 8, wherein said assembly is mounted to said housing means from the exterior of said housing means.

10. The assembly according to claim 8, wherein said sealing means snugly grips said jet forming means and second snout means to hold said jet forming means and second snout means in an assembled relation even when said assembly is not mounted in said housing means.

11. The assembly according to claim 10, wherein said assembly is mounted to said housing means from the exterior of said housing means.

12. A cutting head, comprising:

(A) means defining an axially extending nozzle supply passageway including a downstream-most threaded section and an upstream smooth walled section; and (B) a fluid jet cutting assembly seated within said passageway and defining its own axially extending bore in fluid communication with said passageway, said assembly including (a) an integrally formed set screw defining a downstream segment of said bore, said set screw having (i) a downstream-most axially extending and externally threaded shaft thread connected into the threaded section of said passageway, said shaft defining a drive recess at its downstream end for receiving a drive means such as a screw driver, (ii) an axially extending first snout which is located directly adjacent and upstream from said shaft and which includes a smooth walled outer surface having a diameter less than the minimum outer diameter of said shaft, whereby the diameter of said first snout is less than the minimum diameter of the threaded section of said passageway and thereby easily passes therethrough, said first snout including at least an upstream-most segment which is smaller in outer diameter than the diameter of the smooth walled section of said passageway and extending at least partially into the latter passageway section whereby to form an annular void therebetween, and (iii) an upstream-most axially extending second snout which is located directly adjacent and upstream from said first snout and which includes a smooth walled outer surface having a diameter less than the outer diameter of said first snout;

(b) a nozzle located directly against and upstream of the upstream end of said second snout in coaxial relationship with the latter, said nozzle including a smooth walled outer surface having a diameter at least approximately equal to the outer diameter of said second snout, said nozzle defining an upstream segment of said bore, and (c) a tubular sealing sleeve disposed entirely around the axially extending outer surface of said second snout and directly against the upstream end of said first snout and around at least most of said nozzle, said sleeve having an inner diameter which allows it to grip both the said second snout and nozzle in a friction tight manner in order to hold the set screw and nozzle together, said sleeve being located within the smooth walled section of said passageway upstream of said annular void and being formed of a material which will flow in a plastic manner into said annular void when subjected to the operating pressures of the cutting head.

13. A cutting head according to claim 12 wherein said tubular sleeve extends beyond the upstream end of said nozzle prior to use of the assembly within said passageway and wherein said first snout includes an upstream-most chamfered end for defining said annular void.

14. A cutting head, comprising:
    (A) means defining an axially extending nozzle supply passageway including a downstream-most threaded section and an upstream smooth walled section; and
    (B) a fluid jet cutting assembly seated within said passageway and defining its own axially extending bore in fluid communication with said passageway, said assembly including
       (a) an integrally formed set screw defining a downstream segment of said bore, said set screw having
          (i) a downstream-most axially extending and externally threaded shaft thread connected into the threaded section of said passageway, said shaft defining a drive recess at its downstream end for receiving a drive means such as a screw driver or the like
          (ii) an upstream axially extending section extending at least partially into the smooth walled section of said passageway so as to define an annular void between the latter and an axially extending segment of the upstream set screw section,
       (b) an axially extending nozzle located directly against and upstream of the upstream end of said set screw and defining an upstream segment of said bore, and
       (c) a tubular sealing sleeve located within the smooth walled section of said passageway around all of that portion of the upstream section of said set screw located upstream of said annular void and around the axially extending outer surface of said nozzle, said sleeve being formed of a material which will flow in a plastic manner into said annular void when subjected to the operating pressures of said cutting head.

15. A cutting head according to claim 14 wherein the upstream section of said set screw includes a downstream-most first snout which with the smooth walled section of said passageway defines said annular void and a second snout having an outer diameter which is less than the outer diameter of said first snout.

* * * * *